United States Patent [19]
Conley

[11] 3,776,194
[45] Dec. 4, 1973

[54] AUTOMATIC FEEDER
[76] Inventor: John L. Conley, 3870 Chino Ave., Chino, Calif. 91710
[22] Filed: May 12, 1971
[21] Appl. No.: 142,519

[52] U.S. Cl. ............................. 119/52 B, 119/18
[51] Int. Cl. ........................................ A01k 05/02
[58] Field of Search ....................... 119/18, 22, 52 B

[56] References Cited
UNITED STATES PATENTS

| | | | |
|---|---|---|---|
| 3,164,128 | 1/1965 | Arledge | 119/18 |
| 2,369,316 | 2/1945 | Scott | 119/52 B UX |
| 3,312,194 | 4/1967 | Ernst | 119/22 |
| 3,458,029 | 7/1969 | Allen et al. | 119/22 X |

FOREIGN PATENTS OR APPLICATIONS
967,112  8/1964  Great Britain

Primary Examiner—Hugh R. Chamblee
Attorney—Boniard I. Brown

[57] ABSTRACT

An automatic feeder for an automated poultry handling system and other automated animal handling systems having a number of spaced blocks of cages each including two banks of cages disposed back to back with several tiers of cages in each bank. The feeder has feed troughs to be mounted along the cage tiers of each cage block and a set of interconnected feed hoppers movable in unison along the feed troughs at each side of each block. The two sets of interconnected feed hoppers of each cage block are driven back and forth periodically in unison along their feed troughs to dispense feed into the troughs along the entire lengths of the troughs. The hoppers of each hopper set are interconnected by chutes to permit filling of all the hoppers of the set through a filler opening in the upper hopper.

8 Claims, 4 Drawing Figures

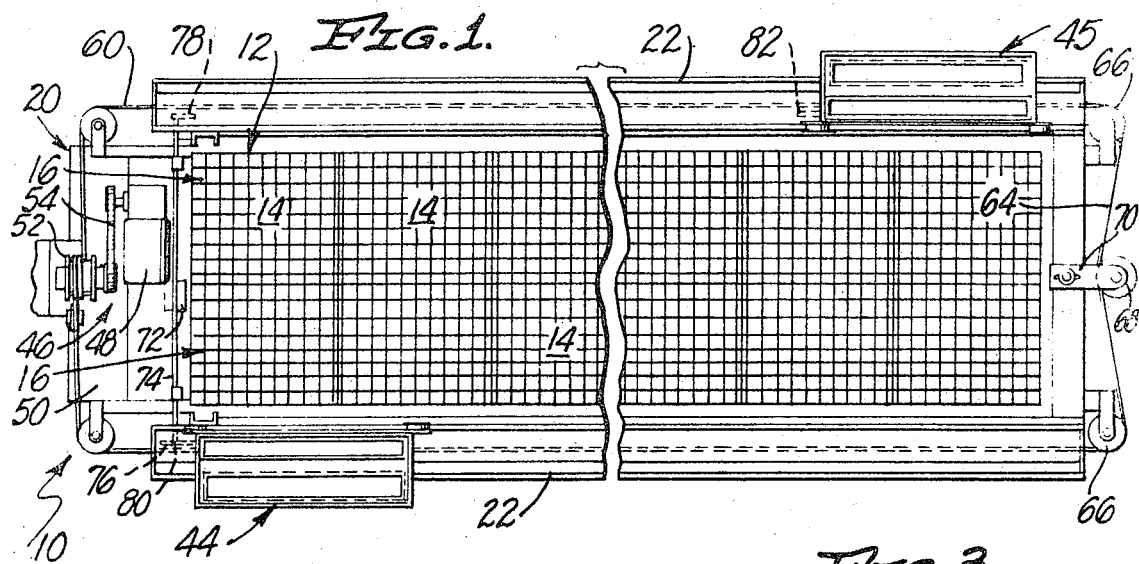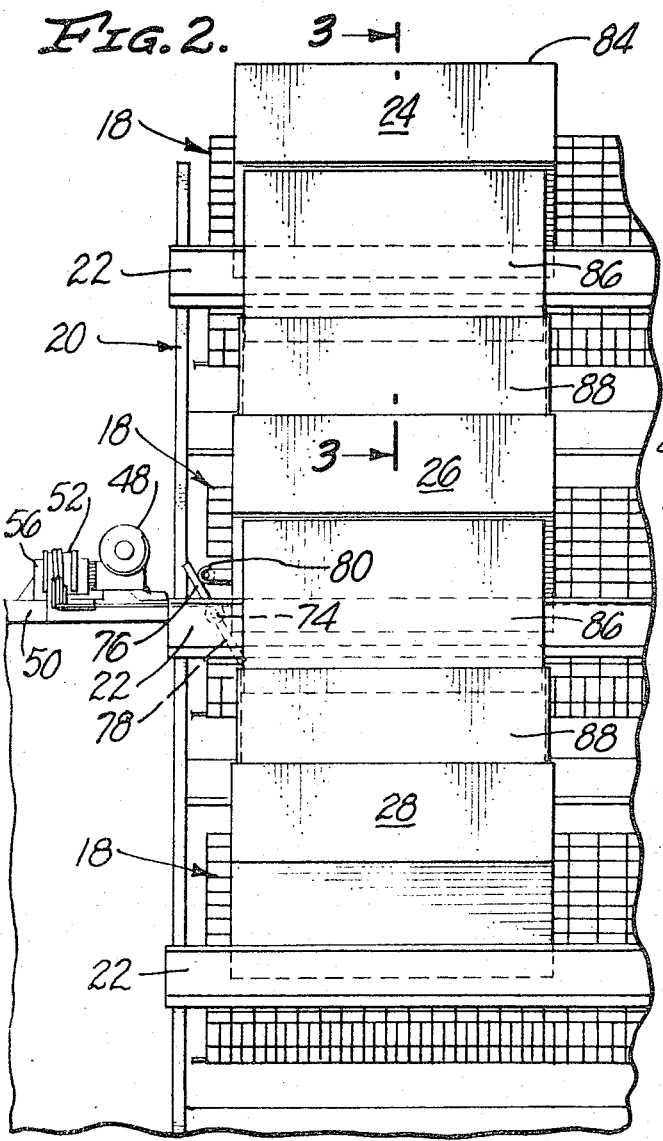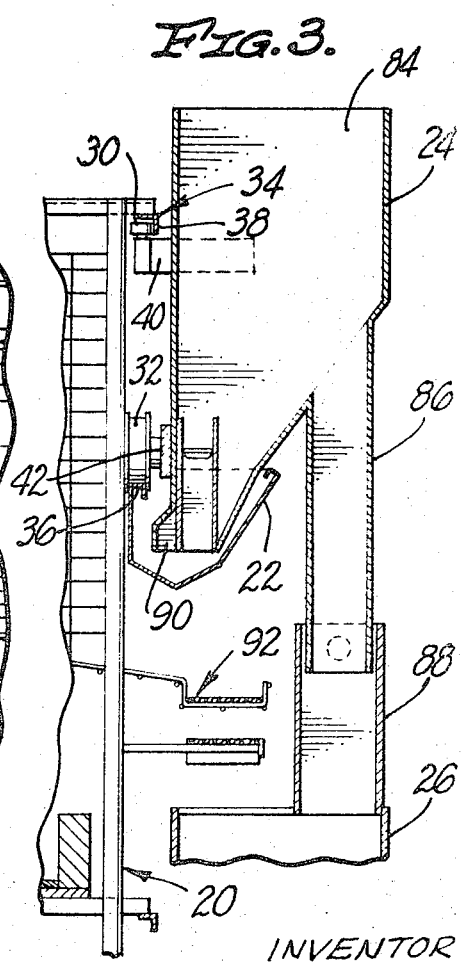

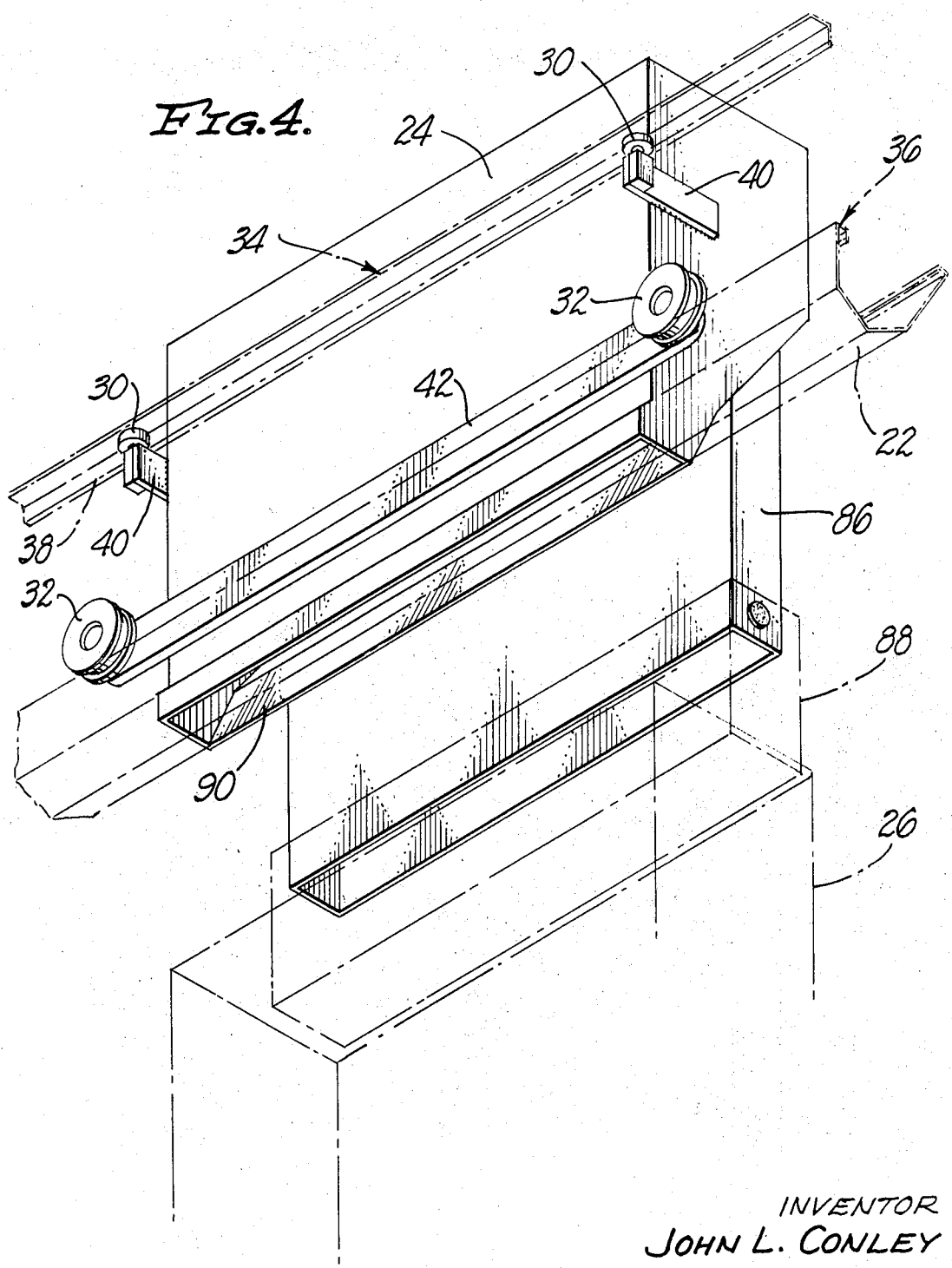

3,776,194

AUTOMATIC FEEDER

RELATED APPLICATIONS

Reference is made herein to my copending applications Ser. No. 142,511, filed May 12, 1971, and entitled "Automatic Poultry Egg Collector", and Ser. No. 142,518, filed May 12, 1971, and entitled "Automatic Animal Dropping Pit Cleaner".

BACKGROUND OF THE INVENTION

1. Field of the Invention

This invention relates generally to automated animal handling systems and more particularly to an automatic feeder for such systems.

2. Discussion of the Prior Art

As will appear from the ensuing description, the automatic feeder of the invention may be employed to advantage in a variety of automated animal handling systems. However, the feeder is designed primarily for use in an automated poultry handling system for egg producing poultry and will be described in this connection.

The ever increasing demand for food products requires constant improvements in and automation of food production techniques. This applies to all types of food production including polutry egg production.

The automation of poultry egg production requires an automated poultry handling system including three basic automated components. These components are an automated poultry feeder, an automated poultry egg collector, and an automated poultry litter remover. The earlier mentioned copending applications disclose an improved automated egg collector and an improved automated dropping pit cleaner for an automated poultry handling system. The present invention provides an improved automatic feeder for an automated poultry handling system and other automated animal handling systems.

SUMMARY OF THE INVENTION

The present invention provides an automatic feeder for an automated poultry handling system or other automated animal handling system having a battery of cages arranged in spaced blocks of cages with access aisles between the adjacent cage blocks. Each cage block has two multi-tiered banks of cages disposed back to back with several cages arranged side by side in each bank tier. Each block of cages is equipped with an automatic feeder according to the invention for furnishing feed to all of the block cages.

The feeder has feed troughs to be mounted along the front or outer sides of the several cage tiers in a cage block. Movable along each trough is a feed hopper for supplying feed to the trough. Drive means are provided for periodically driving the hoppers along their troughs to dispense feed along the entire length of each trough. According to one feature of the invention, the feed hoppers are driven back and forth along the feed troughs at periodic intervals which may be regulated in accordance with the rate at which the feed is consumed. According to another feature, all of the hoppers of each cage block are driven by a common reversible motor through cables which extend about the ends of the block and are attached to the feed hoppers. The motor is reversed automatically upon arrival of the hoppers at each end of the troughs.

Another important feature of the invention is concerned with simplifying the task of filling the hoppers with feed. According to this feature, the several hoppers at each side of each cage block are arranged one over the other in a set. The upper hopper of each set has a filler opening through which feed may be poured into the hopper, and the several hoppers of each set communicate through interconnecting chutes, such feed may pass from each hopper to the next lower hopper. Accordingly, all of the hoppers of each hopper set are filled simultaneously by pouring feed into the upper hopper through its filler opening until the upper hopper is full.

The present feeder is designed primarily for use in an automated poultry egg producing system embodying the automatic egg collector and automatic dropping pit of my earlier mentioned copending applications.

BRIEF DESCRIPTION OF THE DRAWINGS

FIG. 1 is a plan view of an automatic poultry feeder according to the invention installed on a block of poultry cages;

FIG. 2 is an enlarged side elevation of the left end of the cage block and poultry feeder in FIG. 1;

FIG. 3 is a section taken on line 3—3 in FIG. 2; and

FIG. 4 is an enlarged fragmentary view illustrating a feed hopper of the automatic feed system and the manner in which the hopper is mounted for movement along its feed trough.

DESCRIPTION OF THE PREFERRED EMBODIMENT

The drawings illustrate a poultry feeder 10 according to the invention installed on a block 12 of poultry cages 14 of an automated poultry egg producing system. An actual poultry egg producing system embodies a number of cage blocks 12 arranged side by side with access aisles between the adjacent blocks. The several cage blocks together constitute a cage battery. Cage block 12 is composed of two banks 16 of poultry cages 14 disposed back to back. Each cage bank 16 has several levels or tiers 18 of cages arranged one over the other with a number of cages arranged side by side in a row in each tier. In the particular inventive embodiment illustrated, each cage bank 16 has three tiers 18 of cages. Cages 14 are supported by a frame 20.

The automatic poultry feeder 10 includes a number of feed troughs 22 equal to the number of cage tiers 18 in the cage block 12. These feed troughs are mounted in any convenient way along the front or outer sides of the cage tiers at levels such that poultry within the cages may reach feed in the troughs through the openings in the front cage walls. In connection with this trough mounting, it is significant to note in FIG. 3 that the inner or rear wall of each trough is spaced slightly from the front walls of its respective tier of cages. The reason for this spacing will be explained presently.

Movable along the feed troughs 22 at each side of the cage block 12 are feed hoppers 24, 26 and 28. Each hopper is supported for movement along its feed trough by means of rollers 30, 32 on the hopper riding on rails 34, 36 attached to the adjacent cage bank 16. The upper rail 34 is an angle extending horizontally along the top of the respective cage tier 18 and having an outer depending vertical flange 38. The upper rollers 30 are rotatably mounted on arms 40 fixed to opposite sides of and projecting rearwardly from the hopper. Rollers 30 turn on vertical axes and ride on the rear surface of the upper roll flange 38. The lower rail 36 is furnished by a flange along the upper edge of the rear wall of the adjacent feed trough 22. The lower rollers 32 are circumferentially grooved and rotatably mounted on opposite ends of a horizontal support bar 42 fixed to the rear side of the hopper. Rollers 32 turn on horizontal axes and ride along the lower rail 36 with the roller flanges straddling the rail, as shown.

The hoppers 24, 26, 28 at either side of the cage block 12 are located one over the other and are interconnected to form sets 44, 45 of hoppers which are movable in unison along their feed troughs 22. Drive means 46 are provided for driving the two hopper sets back and forth in unison between the ends of their troughs in such a way that the sets move in opposite directions. Drive means 46 comprises a reversible motor 48 mounted on a platform 50 at the left end of the cage block 12 in FIGS. 1 and 2. This platform is located at the level of the center cage tiers 18 of the cage block. Motor 50 drives a winch or winding drum 52 through a chain drive 54. Drum 52 is rotatably supported by a bracket 56 on the platform 50 to turn on a horizontal axis extending endwise of the cage block. Fixed to and wound in opposite directions about the drum 52 are cables 60 which pass around rollers 62 on the platform 50 and are fixed at ends to the center hoppers 26 of the hopper sets 44, 45. A cable 64 is fixed at its ends to the center hoppers 26 and passes around rollers 66 on the right end of the cage block 12 in FIG. 1. Between the rollers 66 is a tensioning roller 68 attached to the cage block by means of an adjustable bracket 70. Roller 68 and bracket 70 are adjustable to regulate the tension in the cables 60, 64.

From the above description of the hopper drive means 46, it is evident that rotation of the drum 52 in one direction by the motor 48 drives the feed hopper sets 44, 45 in unison but in opposite directions along their feed troughs 22 from their positions of FIG. 1 to the opposite ends of the troughs. Rotation of the drum in the other direction drives the hopper sets in the opposite directions back to their positions of FIG. 1.

Motor 48 is energized by a control circuit (not shown) including a reversing switch 72 which is operable to reverse the direction of rotation of the motor and hence the direction of rotation of the drum 52. Switch 72 is actuated by a shaft 74 rotatably supported on and extending across the left end of the cage block 12 in FIGS. 1 and 2. Fixed to opposite ends of this shaft are transverse arms 76, 78 which extend in opposite radial directions from the shaft. Arms 76, 78 are located for engagement by rollers 80, 82 on the center feed hoppers 26 of the hopper sets 44, 45 upon arrival of the latter at the left ends of their troughs 22. Engagement of the rollers 80 on the hopper set 44 with the arm 76 rotates the shaft 74 in one direction to actuate the switch 72 to a position in which the motor 48 is energized to drive the hopper sets 44, 45 from their positions of FIG. 1 to the opposite ends of their feed troughs. As the hopper set 45 approaches the left end of its feed trough in FIG. 1, its roller 82 engages the arm 78 to rotate shaft 74 in the opposite direction. This action actuates switch 72 to a position in which the motor 48 is energized to drive the hopper sets in the reverse direction back to their positions of FIG. 1, and the cycle is then repeated. Accordingly, the hopper sets are driven back and forth along their feed troughs. If desired, the motor energizing circuit may embody adjustable delay or timing means for retaining the hoppers at the ends of their troughs for a period of time so as to effect movement of the hoppers along troughs at periodic intervals in accordance with the rate of feed consumption.

According to a feature of the invention, all of the three feed hoppers 24, 26, 28 of each hopper set 44, 45, are filled through a filler opening 84 at the upper end of the upper hopper 24. To this end, the hoppers of each set communicate through telescoping chutes 86, 88 on adjacent hoppers, whereby feed poured into the upper hopper flows from the latter hopper to the lower hoppers until all the hoppers are filled. These telescoping chutes also interconnect the hoppers mechanically for movement of the hoppers of each set in unison. The telescoping arrangement of the chutes accommodates any slight relative vertical movement the hoppers may undergo during their back and forth travel along the feed troughs. At the lower end of each hopper is an outlet 90 opening to the bottom of the adjacent feed trough 22 through which feed drains from the hopper into the trough.

The operation of the present poultry feeder is now evident. During this operation, the hopper sets 44, 45 are driven back and forth along their feed troughs 22 to dispense feed into the troughs along their entire length.

As noted earlier, the poultry feeder is designed primarily for use in an automated poultry egg producing system embodying the automatic egg collector and automatic poultry dropping pit cleaner of my earlier mentioned copending applications. The egg collector is shown in part at 92.

What is claimed as new in support of letters patent is:

1. An automatic feeder for an automated animal handling system having a row of cages comprising:
   a feed trough,
   means mounting said trough along said cage row,
   a feed hopper for containing feed and having an outlet opening to said trough through which said feed may pass from said hopper into said trough,
   means supporting said hopper for movement along said trough including a member such as a roller on said hopper riding on a longitudinal edge of said trough to vertically support said hopper on said trough, and
   means for driving said hopper along said trough to dispense feed into the trough along its entire length.

2. An automatic feeder for an automated animal handling system having a bank of cages containing several tiers arranged one over the other with a number of cages disposed side by side in each tier, comprising:
   feed troughs trough means mounting said troughs along said cage tiers, respectively,
   a feed hopper for each trough, the several hoppers being arranged one over the other,
   means independently supporting each hopper for movement along its respective trough including a member such as a roller on each hopper riding on a longitudinal edge of its respective trough to vertically support each hopper on its trough,
   means connecting said hoppers for movement in unison along said troughs and for relative vertical movement of the hoppers,
   each hopper having an outlet opening to its respective trough through which feed may pass from the hopper to the trough, and means for driving said hoppers along said troughs to dispense feed into the troughs along their entire length.

3. An automatic feeder according to claim 2 wherein: said outlet opening of each hopper extends the full width of the hopper in its direction of movement.

4. An automatic feeder according to Claim 2 wherein:
said drive means are connected to one hopper, and
means connecting said hoppers for movement in unison along said troughs by said drive means.

5. An automatic feeder according to claim 2 wherein:
the upper hopper has a filler opening through which feed may be poured into the upper hopper, and
said connecting means comprise telescoping chutes communicating the hoppers for passage of feed from the upper hopper to the lower hoppers, whereby all of the hoppers are fillable through said filler opening.

6. An automatic feeder for an automated animal handling system having a bank of cages containing several tiers arranged one over the other with a number of cages disposed side by side in each tier, comprising:
feed troughs trough means mounting said troughs along said cage tiers, respectively,
a feed hopper for each trough, the several hoppers being arranged one over the other,
means independently supporting each hopper for movement along its respective trough including a member such as a roller on each hopper riding on a longitudinal edge of its respective trough to vertically support each hopper on its trough,
a filler opening in the upper hopper through which feed may be poured into the upper hopper,
telescoping chutes connecting the hoppers for movement in unison along said troughs and for relative vertical movement of the hoppers and communicating said hoppers for passage of feed from the upper hopper to the lower hoppers, whereby all the hoppers are fillable through said filler opening.

7. An automatic feeder for an automated animal handling system having a block of cages including two banks of cages disposed back to back and each having several tiers arranged one over the other with a number of cages disposed side by side in each tier, comprising:
feed troughs trough means mounting said troughs along said cage tiers, respectively,
a feed hopper for each trough, the several hoppers at each side of said cage block being located one over the other and constituting a hopper set,
means independently supporting the hoppers on and for movement along their respective troughs,
each hopper having an outlet opening to its respective trough through which feed may pass from the hopper to the trough,
means connecting the hoppers of each hopper set for movement in unison along their troughs and for relative vertical movement of the hoppers of each set, and
common drive means for driving the two sets of connected hoppers in unison along their troughs, said drive means comprising cables extending around the ends of said cage block and attached to corresponding hoppers of said sets for movement of said hopper sets in unison in opposite directions along their respective troughs, a reversible motor for driving one cable endwise alternately in opposite directions, and means for reversing said motor at the limits of travel of said hopper sets.

8. An automatic feeder according to claim 7 wherein:
the upper hoppers in said hopper sets have filler openings through which feed may be poured into the upper hoppers, and
said connecting means of each hopper set comprise telescoping chutes communicating the adjacent hoppers of the set, whereby all the hoppers of each hopper set may be filled through the filler opening of the respective upper hopper.

* * * * *